United States Patent [19]

Nakamura et al.

[11] 4,449,793

[45] May 22, 1984

[54] INVERTED TELEPHOTO TYPE WIDE ANGLE LENS SYSTEM

[75] Inventors: Akiyoshi Nakamura, Sakai; Hisashi Tokumaru, Osaka, both of Japan

[73] Assignee: Minolta Camera Kabushiki Kaisha, Higashi, Japan

[21] Appl. No.: 288,286

[22] Filed: Jul. 30, 1981

[30] Foreign Application Priority Data

Aug. 12, 1980 [JP] Japan .................................. 55-111352

[51] Int. Cl.³ .............................................. G02B 13/04
[52] U.S. Cl. ................................................... 350/458
[58] Field of Search ................................ 350/458-462

[56] References Cited

U.S. PATENT DOCUMENTS

| | | | |
|---|---|---|---|
| 3,923,369 | 12/1975 | Nakamura | 350/461 X |
| 4,025,170 | 5/1977 | Kawamura | 350/460 X |
| 4,029,397 | 6/1977 | Yamashita | 350/458 |
| 4,099,849 | 7/1978 | Lawson et al. | 350/459 |
| 4,311,367 | 1/1982 | Mori | 350/458 X |

Primary Examiner—John K. Corbin
Assistant Examiner—Scott J. Sugarman
Attorney, Agent, or Firm—Jackson, Jones & Price

[57] ABSTRACT

An inverted telephoto type wide angle lens system is provided. The lens system comprises an aperture stop, a first lens group located at the object side of the aperture stop, and a second lens group located at the image side of the aperture stop, the second lens group including at least two movable focusing lens groups, whereby the focusing is practiced by only the movement of the focusing lens groups with the remaining lens elements in the lens system stationary.

19 Claims, 52 Drawing Figures

FIG.1

FIG.2a Spherical Aberration Sine Condition

FIG.2b Astigmatism

FIG.2c Distortion

FIG.3a Spherical Aberration Sine Condition

FIG.3b Astigmatism

FIG.3c Distortion

FIG.4a

Spherical Aberration
Sine Condition

FIG.4b

Astigmatism

FIG.4c

Distortion

Spherical Aberration
Sine Condition

FIG.12b

Astigmatism

FIG.12c

Distortion

FIG.13a

Spherical Aberration
Sine Condition

FIG.13b

Astigmatism

FIG.13c

Distortion

FIG.14

FIG.15a
∞
f/2.8
-1.0 0 1.0
Spherical Aberration
Sine Condition

FIG.15b
ω=42°
-1.0 0 1.0
Astigmatism

FIG.15c
ω=42°
-4.0 0 4.0 (%)
Distortion

FIG.16a
β=0.05
f/2.8
-1.0 0 1.0
Spherical Aberration
Sine Condition

FIG.16b
ω=42°
-1.0 0 1.0
Astigmatism

FIG.16c
ω=42°
-4.0 0 4.0 (%)
Distortion

INVERTED TELEPHOTO TYPE WIDE ANGLE LENS SYSTEM

BACKGROUND OF THE INVENTION

1. Field of the Invention

The present invention relates to an inverted telephoto type wide angle lens system for a single lens reflex camera, and more particularly to an improvement in a focusing system thereof.

2. Description of Prior Art.

In the field of interchangeable lens systems for single lens reflex cameras, a wide angle lens system is generally of an inverted telephoto type having a negative front lens group for securing a sufficient back focal distance thereby enabling the flip up motion of the reflex mirror. The focusing in such an inverted telephoto type wide angle lens system has been generally practiced by means of shifting the whole lens system. In close focusing, however, the image is seriously disturbed in the zonal to marginal area because of the asymmetric power distribution with respect to the aperture stop specific to this type of lens system. Especially, the over-correction of astigmatism and the under-correction of spherical aberration are apt to be caused upon close focusing.

To overcome the above mentioned disadvantage, one or more necessary air spaces in the inverted telephoto type lens system have been conventionally changed in association with the shifting of the whole lens system for compensating the deterioration of aberration correction in close focusing. This compensation system, however, has required both a lens barrel mechanism for shifting the whole lens system and a lens barrel mechanism for changing the one or more air spaces cooperative with the whole lens shifting mechanism, to result in a total lens barrel mechanism of a highly complex and bulky type in comparison with an ordinary lens barrel mechanism having no compensation system.

On the other hand, various inverted telephoto type wide angle lens systems have been suggested in the prior art such as those disclosed in U.S. Pat. Nos. 4,029,397 and 4,099,849 and German Patent Application Laid Open No. DOS 2,946,182.

The consumer requirements of the camera industry have placed increasing demands on lens designers to provide ever increasing optical performances while further compacting and making lightweight lens systems. Accordingly, even though the prior art is crowded in attempts to achieve improved optical performance, there is still a demand to provide an improved inverted telephoto type wide angle lens system.

SUMMARY OF THE INVENTION

It is an object of the present invention to provide a wide angle lens system having well corrected aberrations even in close focusing, while providing a greater aperture ratio and a relatively simple lens barrel mechanism.

Another object of the present invention is to provide a compact and simple inverted telephoto type wide angle lens system which is capable of focusing to a considerably close object with high speed and high optical performance.

Still another object of the present invention is to provide an inverted telephoto type wide angle lens system which is suitable for use in an automatic focus control camera.

The present invention is directed to an inverted telephoto type wide angle lens system which comprises an aperture stop, a first lens group located at the object side of the aperture stop, and a second lens group located at the image side of the aperture stop, the second lens group including at least two movable focusing lens units, whereby the focusing is practiced by only the movement of the focusing lens units with the remaining lens elements in the lens system left stationary.

According to the above feature of the present invention, two to four air spaces can be changed when two focusing lens units in the second lens group are moved for close focusing. Therefore, the freedom of design in compensating for the deterioration of aberration correction upon close focusing can be sufficiently secured by means of utilizing the changeable air spaces, although the lens movement for focusing is relatively simple.

The lens system according to the present invention further fulfills the following conditions:

$$-0.7/f < 1/f_a < 0.2/f$$

$$0.7f < f_{M2} < 5.3f$$

$$0.05 < |R| < 1.5$$

$$0.03 < (f_{M1}/f_{M2}) \cdot R < 1.5$$

wherein:

f represents the focal length of the whole lens system;

$f_a$ represents the focal length of a lens group defined between the front surface of the lens system and an object side surface forming an air space which is reduced by the movement of the object side one of the focusing lens groups upon close focusing;

R represents the ratio of the amount of movement of the object side one of the focusing lens units to that of the image side one of the focusing lens units;

$f_{M1}$ represents the focal length of the object side one of the focusing lens units; and $f_{M2}$ represents the focal length of the image side one of the focusing lens units.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DETAILED DESCRIPTION OF THE PREFERRED EMBODIMENTS

The following description is provided to enable any person skilled in the optical art to make and use the present invention and sets forth the best modes contemplated by the inventors of carrying out their invention. Various modifications, however, will remain readily apparent to those skilled in the art, since the generic principles of the present invention have been defined herein specifically to provide a compact inverted telephoto type wide angle lens system.

The derivation of the specific parameters of the lens embodiments disclosed herein can be accomplished with the assistance of a computer. The present invention represents the parameters of a compromised balance of acceptable aberrations in a relatively easily manufactured lens assembly that is particularly suited for a single lens reflex camera. The data presented herein in the tables, to be discussed subsequently, are more than adequate to permit a competent artisan in the optical art to reproduce the embodiments of the present invention. In the accompanying drawings, which supplement the following tables, the lenses in accordance with the present invention are illustrated schematically. As usual, in conventional lens diagrams, the light is assumed to travel from left to right and the individual lens groups are designated by the letter, L, with a subscript indicating the position of the lenses as numbered consecutively from the object to image side.

In the tables, the minus (−) signs indicate surfaces concave toward the object side, while the surfaces without a sign are convex toward the object side. The radius of curvature is disclosed and is indicated by the letter, r, with a subscript corresponding to the consecutive surfaces of the lens elements from left to right. The axial distances are designated with the letter, d, again with the subscript indicating the distance consecutively from the left to the right. The axial distances will include both the thickness of the lens and the air spaces, and in this regard, the value of the axial spacings between the lens elements are appropriately positioned in the tables relative to the values of the radius of curvature to indicate whether the axial distance is an air space or a thickness of the lens. The air space with asterisk (*) in the tables is changed in accordance with focusing. The tables also provide, with respect to each embodiment, the field angle 2ω, the F number, and the focal length. The refractive index is designated as Nd, while the Abbe number is νd.

Referring to the specific embodiments of the present invention disclosed in FIGS. 1, 5, 8, 11, 14, 17 and 20, the present invention provides an inverted telephoto type wide angle lens system comprising an aperture stop (A), a first lens group located at the object side of the aperture stop, and a second lens group located at the image side of the aperture stop, the second lens group including at least two movable focusing lens units (I and II), whereby the focusing is practiced by only the movement of the focusing lens units (I and II) with the remaining lens elements in the lens system left stationary. The focusing lens units can comprise one or more lens components.

The lens system according to the present invention further fulfills the following conditions:

(1) $-0.7/f < 1/fa < 0.2/f$ (2) $0.7f < f_{M2} < 5.3f$ (3) $0.05 < |R| < 1.5$ (4) $0.03 < (f_{M1}/f_{M2}) \cdot R < 1.5$ wherein:

f represents the focal length of the whole lens system;

fa represents the focal length of a lens group defined between the front surface of the lens system and an object side surface forming an air space which is reduced by the movement of the object side one of the focusing lens units upon close focusing;

R represents the ratio of the amount of movement of the object side one (I) of the focusing lens units to that of the image side one (II) of the focusing lens units;

$f_{M1}$ represents the focal length of the object side one (I) of the focusing lens units; and $f_{M2}$ represents the focal length at the image side one (II) of the focusing lens units.

Figure 20:
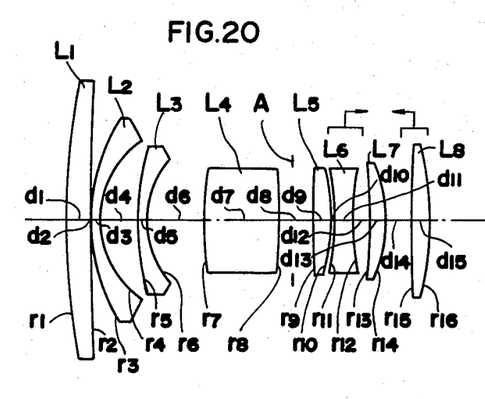
FIG. 20 represents the cross sectional view of the lens system according to the seventh embodiment of the present invention.
Figure 21A:
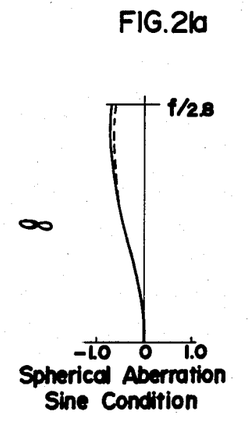
FIGS. 21a to 21c represent the aberration curves of the seventh embodiment.
Figure 21B:
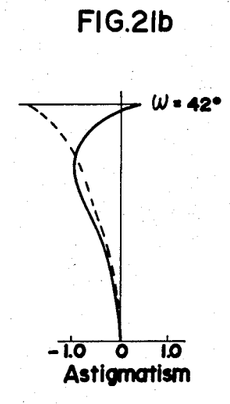
Figure 21C:
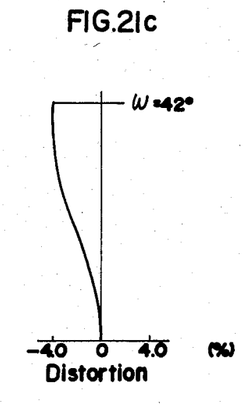

Above condition (1) relates to the light rays entering into the image side surface forming an air space which is reduced by the movement of the object side focusing lens units (I) upon close focusing. For example, light rays entering into $r_{11}$ in FIG. 1 or into $r_{13}$ in FIG. 20 are conditioned. By conditioning light rays according to such condition (1), focusing is achieved with the deterioration of aberration correction sufficiently compensated. If any lower limit of condition (1) is violated to result in an excessive divergence of the light rays entering into the above mentioned image side surface, an overcorrection of the spherical aberration would be caused and the focal length and F number of the whole lens system would be considerably changed in accordance with the focusing. On the other hand, an excessive convergence of the light rays entering into the image side surface would make it impossible to sufficiently correct the spherical aberration if the upper limit of condition (1) is violated.

If the lower limit of the condition (2) which defines the focal length of the image side focusing lens units (II) is violated, an excessively short focal length of the image side focusing lens unit (II) would make it difficult to maintain a necessary aberration correction over entire desirable focusing range since the balance of aberration correction at infinity focusing is hardly realized, although the amount of movement required of the image side focusing lens unit (II) for focusing to a desired close object may be reduced. If the upper limit of condition (2) is violated, however, a greater amount of movement will be required of the image side focusing lens unit (II) for focusing to a desired object, which would cause a bulkiness of the lens system.

Condition (3) relates to the relative movements of the two focusing lens units (I and II). A value for $|R|$ which violates the lower limit of condition (3) means that the amount of movement of the object side focusing lens unit (I) is extremely small relative to that of the image side focusing lens unit (II). In this case, the desired compensation for the deterioration of aberration correction is not expected, or even if it may be expected, the compensation will only be possible when the change in aberrations responsive to the movement of the object side focusing lens unit (I) is extremely great, which is undesirable in view of manufacturing lens products. On the other hand, if the upper limit of condition (3) is violated, the excessive amount of movement of the object side focusing lens unit (I) causes an excessive change in aberrations over the necessary value, to further deteriorate the aberration correction.

Condition (4) defines a practical relationship between the ratio of focal length and the ratio of amount of movement with respect to the two focusing lens units (I and II) for achieving a close focusing without the deterioration of aberration correction. If the lower limit is violated, the manufacturing tolerance would be too strict to realize the designed ability of compensating the deterioration of aberration correction. On the other hand, if the upper limit is violated, a bulkiness of the system and the change in aberrations other than field curvature responsive to the lens movement would be caused even though the field curvature itself may be corrected.

Following Tables 1 to 7 show the embodiments 1 to 7 of the present invention.

TABLE 1

[Embodiment 1]

$f = 100 \; F_{NO} = 2.0 \; 2\omega = 84°$

| | Radius of Curvature | | Axial Distance | | Refractive Index | | Abbe Number |
|---|---|---|---|---|---|---|---|
| L1 | $r_1$ | 217.54 | $d_1$ | 16.00 | $Nd_1$ | 1.5168 $vd_1$ | 64.1 |
|    | $r_2$ | 871.54 | $d_2$ | 0.41 | | | |
| L2 | $r_3$ | 122.00 | $d_3$ | 9.83 | $Nd_2$ | 1.6204 $vd_2$ | 60.3 |
|    | $r_4$ | 54.40  | $d_4$ | 24.00 | | | |
| L3 | $r_5$ | 125.98 | $d_5$ | 8.57 | $Nd_3$ | 1.6204 $vd_3$ | 60.3 |
|    | $r_6$ | 55.51  | $d_6$ | 16.88 | | | |
| L4 | $r_7$ | 327.89 | $d_7$ | 49.12 | $Nd_4$ | 1.7618 $vd_4$ | 26.6 |
|    | $r_8$ | −355.46| $d_8$ | 10.00 | (Aperture stop) | | |
| L5 | $r_9$ | 597.62 | $d_9$ | 9.22 | $Nd_5$ | 1.8052 $vd_5$ | 25.4 |
|    | $r_{10}$ | 1232.92 | $d_{10}*$ | 8.00–5.754 | | | |
| L6 | $r_{11}$ | 274.02 | $d_{11}$ | 20.15 | $Nd_6$ | 1.8050 $vd_6$ | 41.0 |
|    | $r_{12}$ | −113.99 | $d_{12}*$ | 1.02–5.266 | | | |
| L7 | $r_{13}$ | −190.47 | $d_{13}$ | 7.72 | $Nd_7$ | 1.8052 $vd_7$ | 25.4 |
|    | $r_{14}$ | 130.20  | $d_{14}$ | 12.00 | | | |
| L8 | $r_{15}$ | −173.74 | $d_{15}$ | 8.60 | $Nd_8$ | 1.6968 $vd_8$ | 55.5 |
|    | $r_{16}$ | −106.87 | $d_{16}$ | 0.41 | | | |
| L9 | $r_{17}$ | −190.96 | $d_{17}$ | 5.00 | $Nd_9$ | 1.8052 $vd_9$ | 25.4 |
|    | $r_{18}$ | −2780.97 | $d_{18}$ | 14.50 | $Nd_{10}$ | 1.7425 $vd_{10}$ | 52.5 |
|    | $r_{19}$ | −126.31 | $d_{19}*$ | 12.00–4.279 | | | |
| L10 | $r_{20}$ | 487.45 | $d_{20}$ | 17.50 | $Nd_{11}$ | 1.6968 $vd_{11}$ | 55.5 |
|     | $r_{21}$ | −234.07 | | | | | |

$fa \; (r_1 \sim r_{10}) = -288.25;$

TABLE 1-continued

[Embodiment 1]

$f = 100$  $F_{NO} = 2.0$  $2\omega = 84°$

| Radius of Curvature | Axial Distance | Refractive Index | Abbe Number |
|---|---|---|---|
| | $fM_2 (r_{20} \sim r_{21}) = 229.23;$ | | |
| | $R = 0.55;$ | | |
| | $fM_1 (r_{11} \sim r_{12}) = 102.37$ | | |

TABLE 2

[Embodiment 2]

$f = 100$  $F_{NO} = 2.0$  $2\omega = 84°$

| | | Radius of Curvature | | Axial Distance | | Refractive Index | | Abbe Number |
|---|---|---|---|---|---|---|---|---|
| L1 | $r_1$ | 231.44 | $d_1$ | 15.50 | $Nd_1$ | 1.5182 | $\nu d_1$ | 59.0 |
| | $r_2$ | 849.42 | $d_2$ | 0.41 | | | | |
| L2 | $r_3$ | 114.14 | $d_3$ | 9.96 | $Nd_2$ | 1.6180 | $\nu d_2$ | 63.4 |
| | $r_4$ | 54.61 | $d_4$ | 24.31 | | | | |
| L3 | $r_5$ | 130.46 | $d_5$ | 8.65 | $Nd_3$ | 1.6180 | $\nu d_3$ | 63.4 |
| | $r_6$ | 58.01 | $d_6$ | 17.34 | | | | |
| L4 | $r_7$ | 1046.19 | $d_7$ | 48.04 | $Nd_4$ | 1.8052 | $\nu d_4$ | 25.4 |
| | $r_8$ | −298.52 | $d_8$ | 10.00 | (Aperture stop) | | | |
| L5 | $r_9$ | 160.59 | $d_9$ | 8.88 | $Nd_5$ | 1.8052 | $\nu d_5$ | 25.4 |
| | $r_{10}$ | 316.29 | $d_{10}*$ | 8.50–4.314 | | | | |
| L6 | $r_{11}$ | 912.95 | $d_{11}$ | 20.16 | $Nd_6$ | 1.7725 | $\nu d_6$ | 49.8 |
| | $r_{12}$ | −115.67 | $d_{12}*$ | 1.02–5.206 | | | | |
| L7 | $r_{13}$ | −174.24 | $d_{13}$ | 8.01 | $Nd_7$ | 1.8052 | $\nu d_7$ | 25.4 |
| | $r_{14}$ | 143.54 | $d_{14}$ | 10.00 | | | | |
| L8 | $r_{15}$ | −302.19 | $d_{15}$ | 4.50 | $Nd_8$ | 1.8052 | $\nu d_8$ | 25.4 |
| | $r_{16}$ | 932.91 | $d_{16}$ | 13.00 | $Nd_9$ | 1.7425 | $\nu d_9$ | 52.5 |
| | $r_{17}$ | −114.53 | $d_{17}*$ | 20.00–3.256 | | | | |
| L9 | $r_{18}$ | −577.66 | $d_{18}$ | 14.00 | $Nd_{10}$ | 1.6968 | $\nu d_{10}$ | 55.5 |
| | $r_{19}$ | −140.89 | $d_{19}*$ | 0.60–17.344 | | | | |
| L20 | $r_{20}$ | 1035.77 | $d_{20}$ | 10.00 | $Nd_{11}$ | 1.6968 | $\nu d_{11}$ | 55.5 |
| | $r_{21}$ | −536.42 | | | | | | |

$fa (r_1 \sim r_{10}) = -800.08;$
$fM2 (r_{18} \sim r_{19}) = 263.96;$
$R = 0.25;$
$fM1 (r_{11} \sim r_{12}) = 134.04$

TABLE 3

[Embodiment 3]

$f = 100$  $F_{NO} = 2.0$  $2\omega = 84°$

| | | Radius of Curvature | | Axial Distance | | Refractive Index | | Abbe Number |
|---|---|---|---|---|---|---|---|---|
| L1 | $r_1$ | 222.44 | $d_1$ | 15.32 | $Nd_1$ | 1.5168 | $\nu d_1$ | 64.1 |
| | $r_2$ | 840.03 | $d_2$ | 0.41 | | | | |
| L2 | $r_3$ | 122.05 | $d_3$ | 9.96 | $Nd_2$ | 1.6204 | $\nu d_2$ | 60.3 |
| | $r_4$ | 54.12 | $d_4$ | 23.91 | | | | |
| L3 | $r_5$ | 126.19 | $d_5$ | 8.16 | $Nd_3$ | 1.6204 | $\nu d_3$ | 60.3 |
| | $r_6$ | 55.48 | $d_6$ | 16.74 | | | | |
| | $r_7$ | 337.53 | | | | | | |

TABLE 3-continued

[Embodiment 3]

$f = 100\ F_{NO} = 2.0\ 2\omega = 84°$

| | Radius of Curvature | | Axial Distance | Refractive Index | | Abbe Number |
|---|---|---|---|---|---|---|
| L4 | $r_8$ | −348.17 | $d_7$ 47.12 | $Nd_4$ 1.7552 | $vd_4$ | 27.5 |
| | | | $d_8$ 10.00 | (Aperture stop) | | |
| L5 | $r_9$ | 319.61 | $d_9$ 7.85 | $Nd_5$ 1.8052 | $vd_5$ | 25.4 |
| | $r_{10}$ | 540.45 | | | | |
| | | | $d_{10}*$ 7.50–4.115 | | | |
| L6 | $r_{11}$ | 255.83 | $d_{11}$ 19.33 | $Nd_6$ 1.8050 | $vd_6$ | 41.0 |
| | $r_{12}$ | −115.44 | | | | |
| | | | $d_{12}*$ 1.02–4.405 | | | |
| L7 | $r_{13}$ | −192.21 | $d_{13}$ 8.19 | $Nd_7$ 1.8052 | $vd_7$ | 25.4 |
| | $r_{14}$ | 123.96 | | | | |
| | | | $d_{14}$ 12.00 | | | |
| L8 | $r_{15}$ | −176.22 | $d_{15}$ 8.60 | $Nd_8$ 1.6968 | $vd_8$ | 55.5 |
| | $r_{16}$ | −99.87 | | | | |
| | | | $d_{16}*$ 12.50–4.978 | | | |
| | $r_{17}$ | −189.34 | $d_{17}$ 4.50 | $Nd_9$ 1.8052 | $vd_9$ | 25.4 |
| L9 | $r_{18}$ | −2018.37 | $d_{18}$ 14.50 | $Nd_{10}$ 1.7425 | $vd_{10}$ | 52.5 |
| | $r_{19}$ | −123.63 | | | | |
| | | | $d_{19}$ 0.40 | | | |
| L10 | $r_{20}$ | 483.41 | $d_{20}$ 14.00 | $Nd_{11}$ 1.6968 | $vd_{11}$ | 55.5 |
| | $r_{21}$ | −292.75 | | | | |

$fa\ (r_1 \sim r_{10}) = -312.41;$
$fM2\ (r_{17} \sim r_{21}) = 167.15;$
$R = 0.45;$
$fM1\ (r_{11} \sim r_{12}) = 101.16$

TABLE 4

[Embodiment 4]

$f = 100\ F_{NO} = 2.0\ 2\omega = 84°$

| | Radius of Curvature | | Axial Distance | Refractive Index | | Abbe Number |
|---|---|---|---|---|---|---|
| L1 | $r_1$ | 224.63 | $d_1$ 15.50 | $Nd_1$ 1.5182 | $vd_1$ | 59.0 |
| | $r_2$ | 782.58 | | | | |
| | | | $d_2$ 0.41 | | | |
| L2 | $r_3$ | 102.10 | $d_3$ 9.96 | $Nd_2$ 1.6180 | $vd_2$ | 63.4 |
| | $r_4$ | 54.75 | | | | |
| | | | $d_4$ 25.27 | | | |
| L3 | $r_5$ | 103.88 | $d_5$ 10.13 | $Nd_3$ 1.6180 | $vd_3$ | 63.4 |
| | $r_6$ | 56.27 | | | | |
| | | | $d_6$ 18.61 | | | |
| L4 | $r_7$ | −512.00 | $d_7$ 49.07 | $Nd_4$ 1.8052 | $vd_4$ | 25.4 |
| | $r_8$ | −242.66 | | | | |
| | | | $d_8$ 8.00 | (Aperture stop) | | |
| L5 | $r_9$ | 213.26 | $d_9$ 13.39 | $Nd_5$ 1.8052 | $vd_5$ | 25.4 |
| | $r_{10}$ | 12908.22 | | | | |
| | | | $d_{10}*$ 10.00–3.615 | | | |
| L6 | $r_{11}$ | −11793.84 | $d_{11}$ 23.43 | $Nd_6$ 1.7725 | $vd_6$ | 49.8 |
| | $r_{12}$ | −121.53 | | | | |
| | | | $d_{12}*$ 1.02–7.405 | | | |
| L7 | $r_{13}$ | −172.62 | $d_{13}$ 9.52 | $Nd_7$ 1.8052 | $vd_7$ | 25.4 |
| | $r_{14}$ | 160.26 | | | | |
| | | | $d_{14}$ 9.50 | | | |
| | $r_{15}$ | −206.98 | $d_{15}$ 4.50 | $Nd_8$ 1.8052 | $vd_8$ | 25.4 |
| L8 | $r_{16}$ | 1369.49 | $d_{16}$ 12.50 | $Nd_9$ 1.7425 | $vd_9$ | 52.5 |
| | $r_{17}$ | −120.26 | | | | |
| | | | $d_{17}*$ 10.00–3.615 | | | |
| L9 | $r_{18}$ | −375.50 | $d_{18}$ 12.50 | $Nd_{10}$ 1.6968 | $vd_{10}$ | 55.5 |
| | $r_{19}$ | −159.81 | | | | |

TABLE 4-continued

[Embodiment 4]

f = 100 F$_{NO}$ = 2.0 2ω = 84°

| | | Radius of Curvature | | Axial Distance | Refractive Index | | Abbe Number | |
|---|---|---|---|---|---|---|---|---|
| | | | d$_{19}$ | 0.60 | | | | |
| L10 | r$_{20}$ | 891.30 | d$_{20}$ | 17.00 | Nd$_{11}$ | 1.6968 | νd$_{11}$ | 55.5 |
| | r$_{21}$ | −197.77 | | | | | | | fa (r$_1$∼r$_{10}$) = 2724.39;
fM2 (r$_{18}$∼r$_{21}$) = 146.99;
R = 1.0;
fM1 (r$_{11}$∼r$_{12}$) = 158.82

TABLE 5

[Embodiment 5]

f = 100 F$_{NO}$ = 2.8 2ω = 84°

| | | Radius of Curvature | | Axial Distance | Refractive Index | | Abbe Number | |
|---|---|---|---|---|---|---|---|---|
| L1 | r$_1$ | 398.86 | d$_1$ | 12.02 | Nd$_1$ | 1.6935 | νd$_1$ | 53.4 |
| | r$_2$ | 1750.85 | d$_2$ | 0.49 | | | | |
| L2 | r$_3$ | 100.36 | d$_3$ | 4.51 | Nd$_2$ | 1.4875 | νd$_2$ | 70.1 |
| | r$_4$ | 47.43 | d$_4$ | 20.03 | | | | |
| L3 | r$_5$ | 139.81 | d$_5$ | 4.51 | Nd$_3$ | 1.5038 | νd$_3$ | 66.8 |
| | r$_6$ | 47.90 | d$_6$ | 30.05 | | | | |
| L4 | r$_7$ | 173.69 | d$_7$ | 39.26 | Nd$_4$ | 1.7620 | νd$_4$ | 40.4 |
| | r$_8$ | −481.58 | d$_8$• | 17.78–16.868 | (Aperture stop) | | | |
| L5 | r$_9$ | 785.15 | d$_9$ | 9.41 | Nd$_5$ | 1.7425 | νd$_5$ | 52.5 |
| | r$_{10}$ | −114.85 | d$_{10}$ | 5.50 | | | | |
| L6 | r$_{11}$ | −308.31 | d$_{11}$ | 9.52 | Nd$_6$ | 1.8052 | νd$_6$ | 25.4 |
| | r$_{12}$ | 127.72 | d$_{12}$ | 6.50 | | | | |
| L7 | r$_{13}$ | −217.14 | d$_{13}$ | 8.01 | Nd$_7$ | 1.6000 | νd$_7$ | 64.4 |
| | r$_{14}$ | −86.31 | d$_{14}$• | 13.00–3.418 | | | | |
| L8 | r$_{15}$ | 1003.75 | d$_{15}$ | 9.90 | Nd$_8$ | 1.6000 | νd$_8$ | 64.4 |
| | r$_{16}$ | −129.40 | | | | | | | fa (r$_1$∼r$_8$) = −378.50;
fM2 (r$_{15}$∼r$_{16}$) = 191.67;
R = 0.09;
fM1 (r$_9$∼r$_{14}$) = 325.68

TABLE 6

[Embodiment 6]

f = 100 F$_{NO}$ = 2.8 2ω = 84°

| | | Radius of Curvature | | Axial Distance | Refractive Index | | Abbe Number | |
|---|---|---|---|---|---|---|---|---|
| L1 | r$_1$ | 398.86 | d$_1$ | 12.02 | Nd$_1$ | 1.6935 | νd$_1$ | 53.4 |
| | r$_2$ | 1750.85 | d$_2$ | 0.49 | | | | |
| L2 | r$_3$ | 106.27 | d$_3$ | 4.51 | Nd$_2$ | 1.4875 | νd$_2$ | 70.1 |
| | r$_4$ | 47.47 | d$_4$ | 20.03 | | | | |
| L3 | r$_5$ | 130.94 | d$_5$ | 4.51 | Nd$_3$ | 1.5038 | νd$_3$ | 66.8 |
| | r$_6$ | 48.41 | d$_6$ | 30.05 | | | | |
| L4 | r$_7$ | 179.88 | d$_7$ | 39.26 | Nd$_4$ | 1.7620 | νd$_4$ | 40.4 |
| | r$_8$ | −475.91 | d$_8$ | 17.78 | (Aperture stop) | | | |
| L5 | r$_9$ | 639.02 | d$_9$ | 9.41 | Nd$_5$ | 1.7425 | νd$_5$ | 52.5 |

TABLE 6-continued

[Embodiment 6]

$f = 100 \ F_{NO} = 2.8 \ 2\omega = 84°$

|  | | Radius of Curvature | Axial Distance | | Refractive Index | | Abbe Number |
|---|---|---|---|---|---|---|---|
|  | $r_{10}$ | −114.65 | | | | | |
|  | | | $d_{10}$ | 5.50 | | | |
| L6 | $r_{11}$ | −346.53 | $d_{11}$ | 9.52 | $Nd_6$  1.8052 | $\nu d_6$ | 25.4 |
|  | $r_{12}$ | 123.50 | | | | | |
|  | | | $d_{12}*$ | 8.50–6.10 | | | |
| L7 | $r_{13}$ | −217.30 | $d_{13}$ | 8.01 | $Nd_7$  1.6000 | $\nu d_7$ | 64.4 |
|  | $r_{14}$ | −86.97 | | | | | |
|  | | | $d_{14}*$ | 13.00–5.799 | | | |
| L8 | $r_{15}$ | 782.80 | $d_{15}$ | 9.90 | $Nd_8$  1.6000 | $\nu d_8$ | 64.4 |
|  | $r_{16}$ | −141.40 | | | | | |

$fa \ (r_1 \sim r_{12}) = -252.14;$
$fM2 \ (r_{15} \sim r_{16}) = 200.42;$
$R = 0.25;$
$fM1 \ (r_{13} \sim r_{14}) = 236.23$

TABLE 7

[Embodiment 7]

$f = 100 \ F_{NO} = 2.8 \ 2\omega = 84°$

|  | | Radius of Curvature | Axial Distance | | Refractive Index | | Abbe Number |
|---|---|---|---|---|---|---|---|
| L1 | $r_1$ | 431.34 | $d_1$ | 12.02 | $Nd_1$  1.6968 | $\nu d_1$ | 56.5 |
|  | $r_2$ | 1865.48 | | | | | |
|  | | | $d_2$ | 0.49 | | | |
| L2 | $r_3$ | 103.89 | $d_3$ | 4.51 | $Nd_2$  1.4875 | $\nu d_2$ | 70.1 |
|  | $r_4$ | 48.92 | | | | | |
|  | | | $d_4$ | 20.03 | | | |
| L3 | $r_5$ | 147.38 | $d_5$ | 4.51 | $Nd_3$  1.5038 | $\nu d_3$ | 66.8 |
|  | $r_6$ | 48.28 | | | | | |
|  | | | $d_6$ | 30.05 | | | |
| L4 | $r_7$ | 158.12 | $d_7$ | 39.26 | $Nd_4$  1.7495 | $\nu d_4$ | 35.2 |
|  | $r_8$ | −309.20 | | | | | |
|  | | | $d_8$ | 17.78 | (Aperture stop) | | |
| L5 | $r_9$ | 557.59 | $d_9$ | 9.41 | $Nd_5$  1.7425 | $\nu d_5$ | 52.5 |
|  | $r_{10}$ | −109.17 | | | | | |
|  | | | $d_{10}*$ | 1.996–5.99 | | | |
| L6 | $r_{11}$ | −156.56 | $d_{11}$ | 9.52 | $Nd_6$  1.8052 | $\nu d_6$ | 25.4 |
|  | $r_{12}$ | 131.46 | | | | | |
|  | | | $d_{12}*$ | 10.004–6.01 | | | |
| L7 | $r_{13}$ | −222.17 | $d_{13}$ | 8.01 | $Nd_7$  1.6000 | $\nu d_7$ | 64.4 |
|  | $r_{14}$ | −77.00 | | | | | |
|  | | | $d_{14}*$ | 12.99–5.01 | | | |
| L8 | $r_{15}$ | 622.16 | $d_{15}$ | 9.90 | $Nd_8$  1.6031 | $\nu d_8$ | 60.7 |
|  | $r_{16}$ | −155.61 | | | | | |

$fa \ (r_1 \sim r_{12}) = -208.77$
$fM2 \ (r_{15} \sim r_{16}) = 207.38$
$R = -0.5$
$fM1 (r_{11} \sim r_{12}) = -87.46$ The following table summarizes the location of focusing lens focusing in the above embodiments, respectively.

| | focusing lens group (I) | focusing lens group (II) |
|---|---|---|
| embodiment 1 | L6 | L10 |
| 2 | L6 | L9 |
| 3 | L6 | L9 and L10 |
| 4 | L6 | L9 and L10 |
| 5 | L5 to L7 | L8 |
| 6 | L7 | L8 |
| 7 | L6 | L8 |

In response to the movements of the above focusing lens groups, air spaces with asterisk in Tables 1 to 7 are changed, respectively. For each of the variable air spaces with an asterisk, the left-hand value relates to infinity focusing, while the right-hand value relates to close focusing.

FIGS. 1, 5, 8, 11, 14, 17 and 20 correspond to the embodiments 1 to 7, respectively. And FIGS. 2, 6, 9, 12, 15, 18 and 21 are aberration curves of the embodiments 1 to 7, respectively.

It should be noted that R=1.0 in the embodiment 4, which means that the focusing lens units (I and II) are moved in a body with a stationary lens group sandwiched in between for further simplifying the lens barrel mechanism. Further, it should be noted that the object side focusing lens group (I) is moved toward the object side upon close focusing if the refractive power thereof is positive as in FIG. 1, and toward the image side if the refractive power is negative as in FIG. 20.

Figure 1:
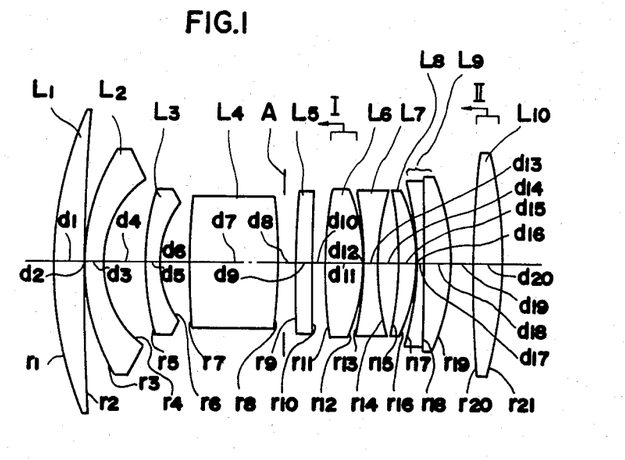
FIG. 1 represents the cross sectional view of the lens system according to the first embodiment of the present invention.
Figure 2A:
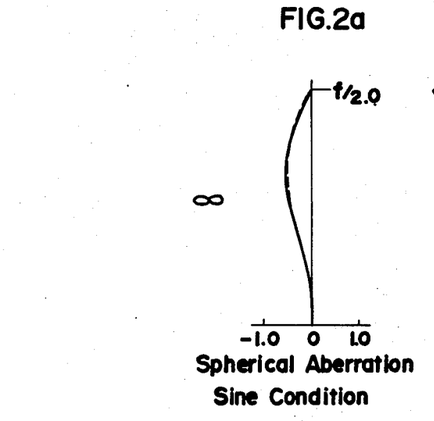
FIGS. 2a to 2c represent the aberration curves of the first embodiment.
Figure 2B:
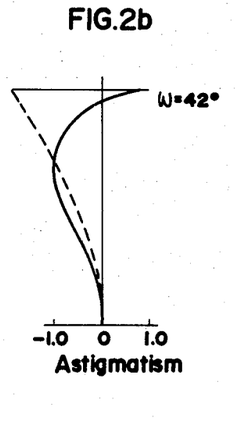
Figure 2C:
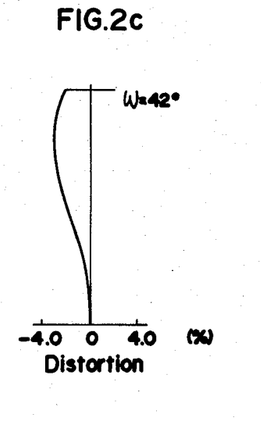
Figure 3A:
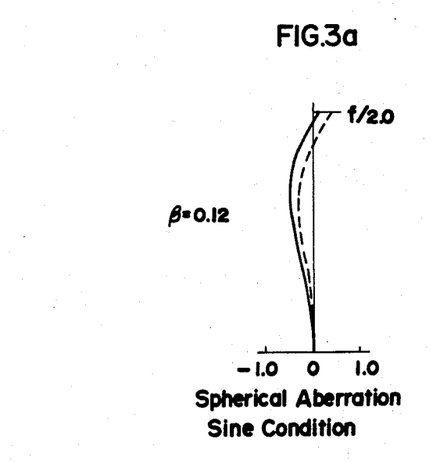
FIGS. 3a to 3c represent the aberration curves of the first embodiment in close focusing.
Figure 3B:
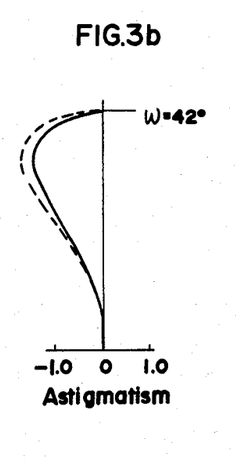
Figure 3C:
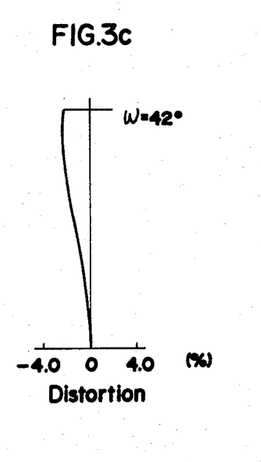
Figure 4A:
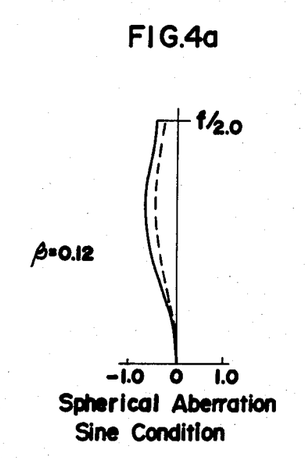
FIGS. 4a to 4c represent the aberration curves of the first embodiment in close focusing according to the conventional manner.
Figure 4B:
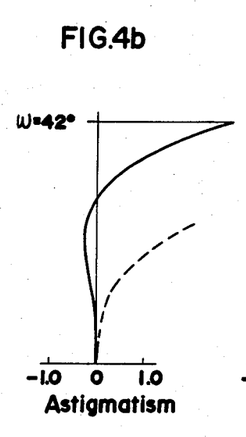
Figure 4C:
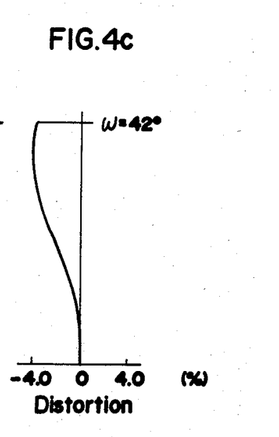
Figure 5:
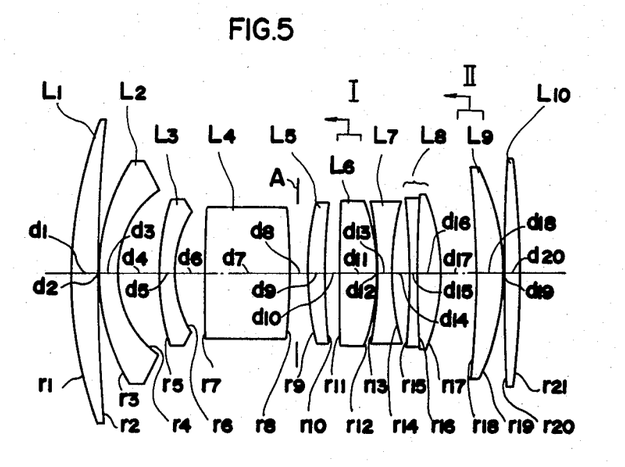
FIG. 5 represents the cross sectional view of the lens system according to the second embodiment of the present invention.
Figure 6A:
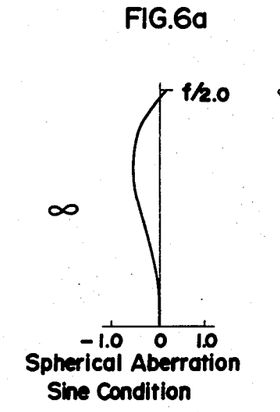
FIGS. 6a to 6c represent the aberration curves of the second embodiment.
Figure 6B:
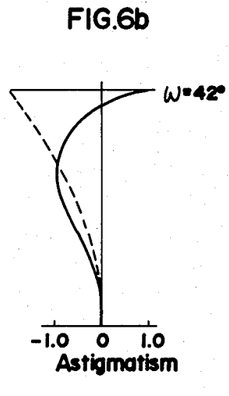
Figure 6C:
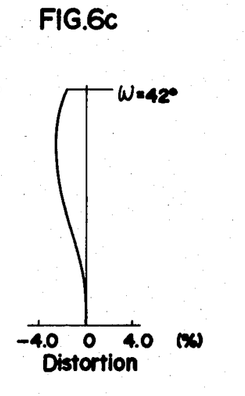

FIGS. 3a, 3b and 3c represent aberrations of the embodiment 1 in close focusing of $\beta=0.12$ by means of moving the lens unit (L6) and lens unit (L10) by 4.246 and 7.721, respectively, both toward the object side. FIGS. 4a, 4b and 4c represent reference aberrations of the embodiment 1 when the close focusing of the same magnification, $\beta=0.12$ is attained by means of the conventional focusing method of moving the whole lens system toward the object side in a body. A comparison between FIGS. 3 and 4 will reveal the advantages of the present invention.

Figure 7A:
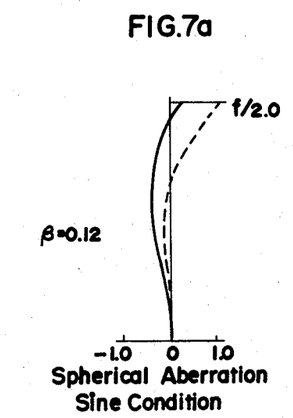
FIGS. 7a to 7c represent the aberration curves of the second embodiment in close focusing.
Figure 7B:
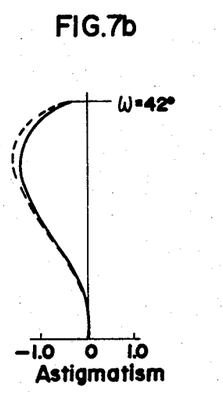
Figure 7C:
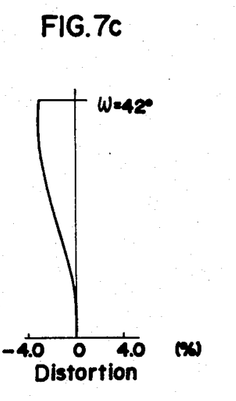
Figure 8:
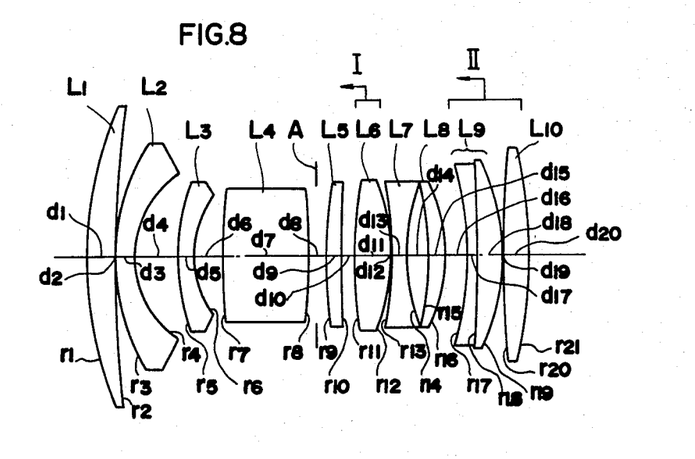
FIG. 8 represents the cross sectional view of the lens system according to the third embodiment of the present invention.
Figures 9A, 9B:
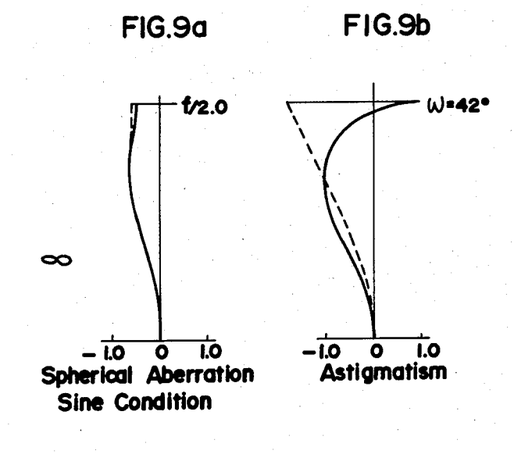
FIGS. 9a to 9c represent the aberration curves of the third embodiment.
Figure 9C:
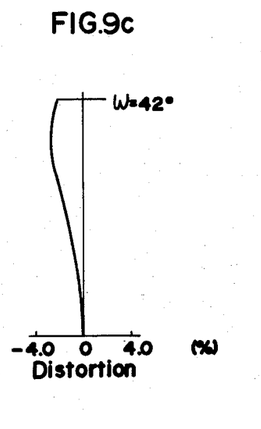

FIGS. 7a, 7b and 7c represent aberrations of the embodiment 2 in close focusing of $\beta=0.12$ by means of moving the lens unit (L6) and lens unit (L9) by 4.186 and 16.744, respectively, both toward the object side.

Figures 10A, 10B:
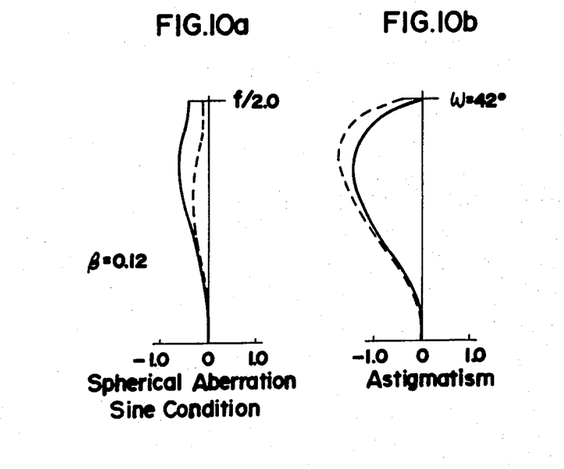
FIGS. 10a to 10c represent the aberration curves of the third embodiment in close focusing.
Figure 10C:
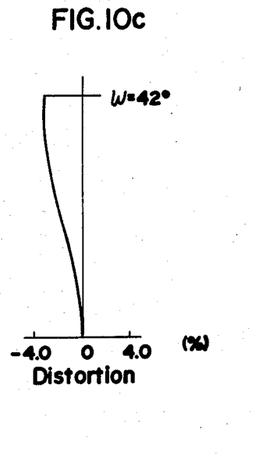
Figure 11:
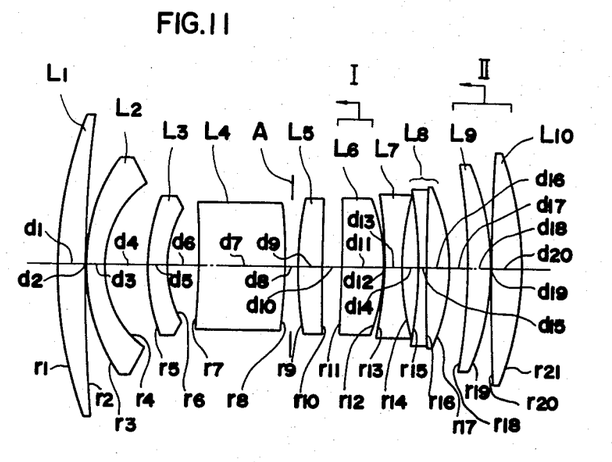
FIG. 11 represents the cross sectional view of the lens system according to the fourth embodiment of the present invention.
Figures 12A, 12B:
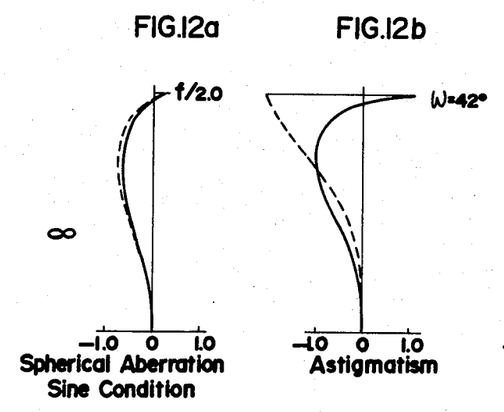
FIGS. 12a to 12c represent the aberration curves of the fourth embodiment.
Figure 12C:
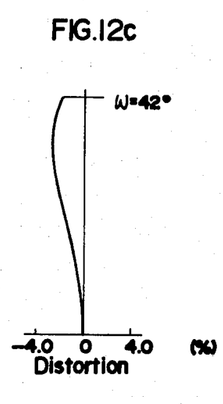

FIGS. 10a, 10b and 10c represent aberrations of the embodiment 3 in close focusing of $\beta=0.12$ by means of moving the lens unit (L6) and lens unit (L9 and L10) by 3.385 and 7.522, respectively, both toward the object side.

Figure 13A:
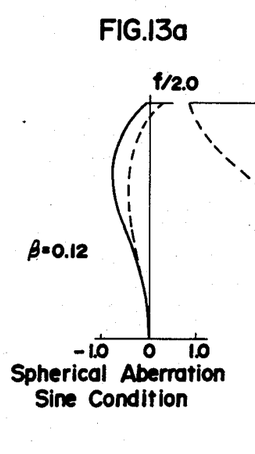
FIGS. 13a to 13c represent the aberration curves of the fourth embodiment in close focusing.
Figure 13B:
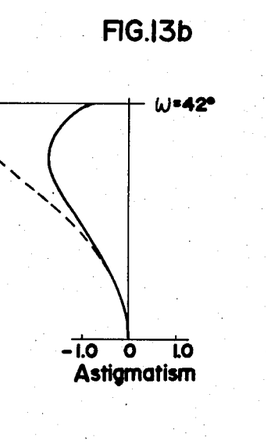
Figure 13C:
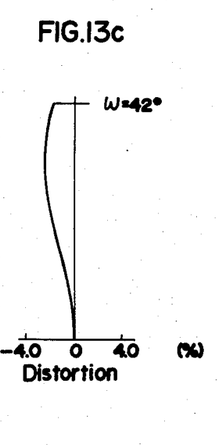
Figure 14:
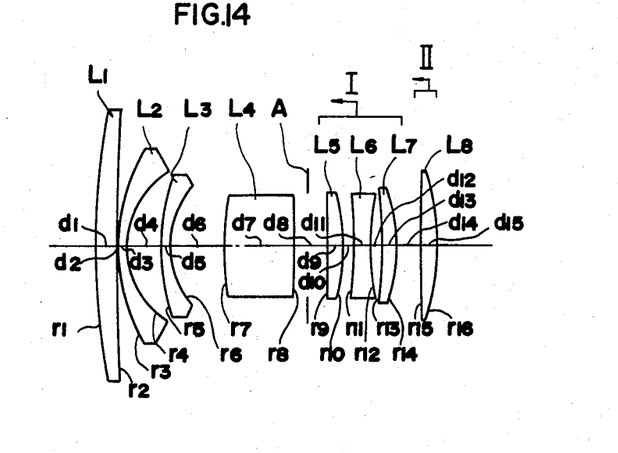
FIG. 14 represents the cross sectional view of the lens system according to the fifth embodiment of the present invention.
Figure 15A:
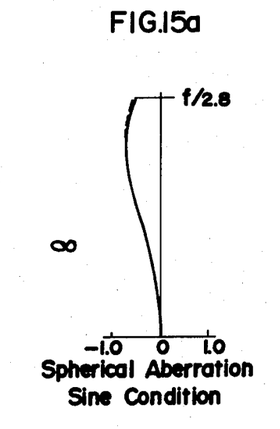
FIGS. 15a to 15c represent the aberration curves of the fifth embodiment.
Figure 15B:
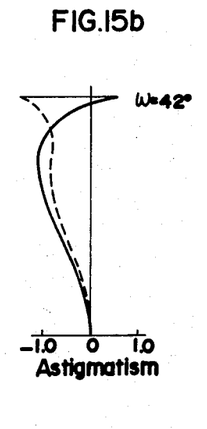
Figure 15C:
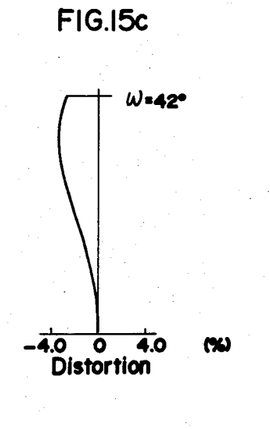

FIGS. 13a, 13b and 13c represent aberrations of the embodiment 4 in close focusing of $\beta=0.12$ by means of moving the lens unit (L6) and lens unit (L9 and L10) both by the same amount, 6.385 in a body toward the object side.

Figure 16A:
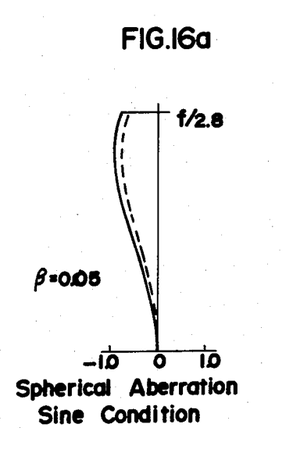
FIGS. 16a to 16c represent the aberration curves of the fifth embodiment in close focusing.
Figure 16B:
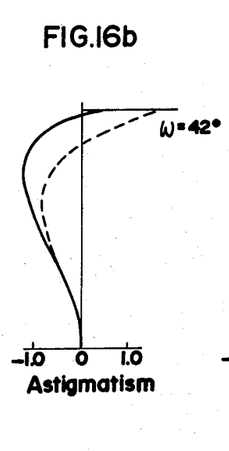
Figure 16C:
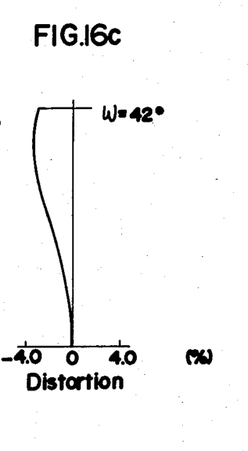
Figure 17:
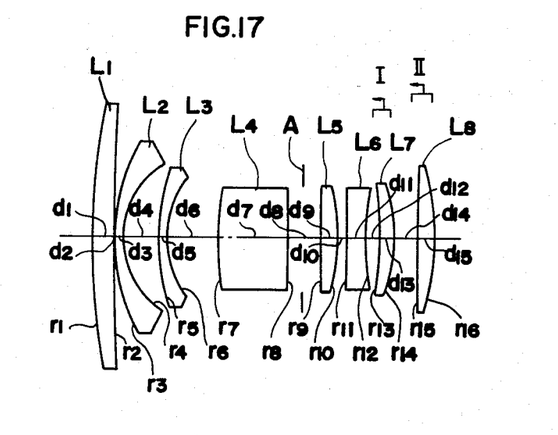
FIG. 17 represents the cross sectional view of the lens system according to the sixth embodiment of the present invention.
Figure 18A:
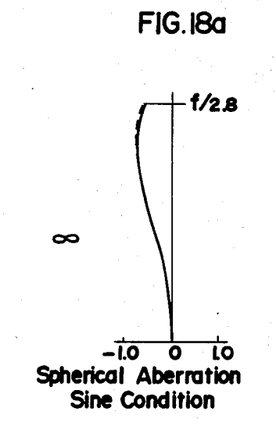
FIGS. 18a to 18c represent the aberration curves of the sixth embodiment.
Figure 18B:
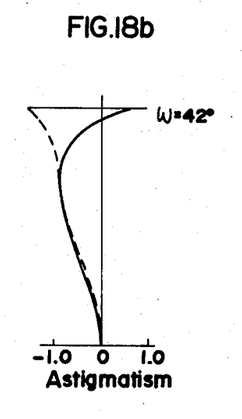
Figure 18C:
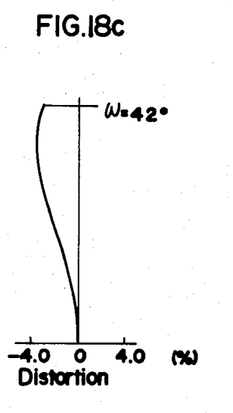

FIGS. 16a, 16b and 16c represent aberrations of the embodiment 5 in close focusing of $\beta=0.05$ by means of moving the lens unit (L5 to L7) and lens unit (L8) by 0.912 and 10.494, respectively, both toward the object side.

Figure 19A:
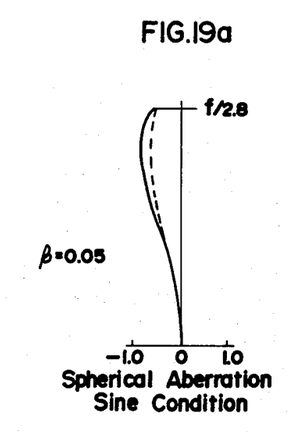
FIGS. 19a to 19c represent the aberration curves of the sixth embodiment in close focusing.
Figure 19B:
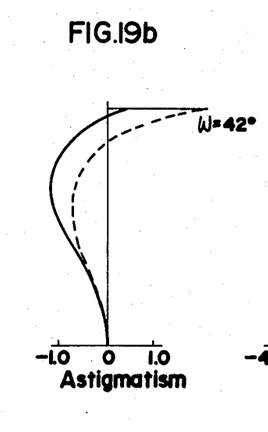
Figure 19C:
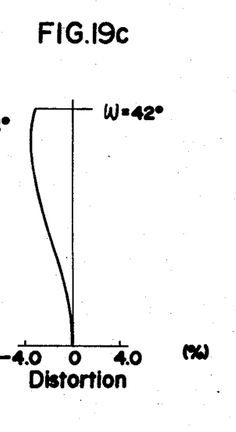

FIGS. 19a, 19b and 19c represent aberrations of the embodiment 6 in close focusing $\beta=0.05$ by means of moving the lens unit (L7) and lens unit (L8) by 2.4 and 9.601, respectively, both toward the object side.

Figure 22A:
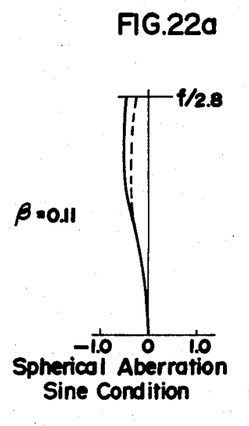
FIGS. 22a to 22c represent the aberration curves of the seventh embodiment in close focusing.
Figure 22B:
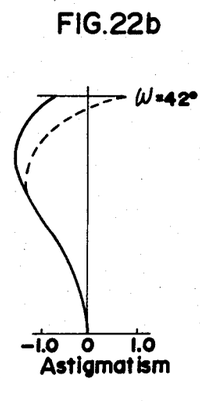
Figure 22C:
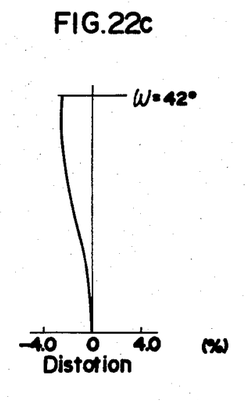

FIGS. 22a, 22b and 22c represent aberrations of the embodiment 7 in close focusing of $\beta=0.11$ by means of moving the lens unit (L6) and lens unit (L8) by 3.994 and 7.987, respectively, the former toward the object side and the latter toward the object side.

Although all the embodiment disclose a lens system with two focusing lens units, it would be possible to add one or more movable focusing lens units on the image side of the aperture stop if necessary.

Since the lens system according to the present invention carried out the close focusing by means of moving at least two focusing lens units located at the image side of the aperture stop, the focusing lens units are light weight and located close to the camera body. Such a feature is quite suitable for a focus control by means of a driving power source located within a camera body, such as in an automatic focus control camera. Namely, the location of the focusing lens units close to the camera body simplifies the interconnection between the focusing lens units and the driving power source. Further, the light weight of the focusing lens units saves the energy consumption of the driving power source to move the focusing lens units. These advantages will be best understood when the above described automatic focus control of lens system according to the present invention is compared with a case that a conventional lens system with a compensation system to change one or more changeable air spaces in accordance with the movement of the whole lens system is to be controlled by a driving power source located with a camera body.

While the above embodiments have been disclosed as the best modes presently contemplated by the inventors, it should be realized that these examples should not be interpreted as limiting, because artisans skilled in this field, once given the present teachings can vary from these specific embodiments. Accordingly, the scope of the present invention should be determined solely from the following claims.

What is claimed is:

1. An inverted telephoto type wide angle lens system comprising:
   an aperture stop;
   a first lens group located at the object side of the aperture stop; and
   a second lens group located at the image side of the aperture stop, the second lens group including at least two movable focusing lens units with at least one variable air space being located between the two movable focusing lens units, the focusing being practiced by only the movement of the focusing lens units to cause a change in the variable air space, said system including other lens units which remain stationary.

2. The invention of claim 1, wherein the lens system fulfills the following condition:

$$0.05 < |R| < 1.5$$

wherein R represents the ratio of the amount of movement of the object side one of the focusing lens units to that of the image side one of the focusing lens units.

3. The invention of claim 2, wherein the lens system further fulfills the following condition:

$$0.03 < (f_{M1}/f_{M2}) \cdot R < 1.5$$

wherein:
   $f_{M1}$ represents the focal length of the object side one of the focusing lens units; and
   $f_{M2}$ represents the focal length of the image side one of the focusing lens units.

4. The invention of claim 3, wherein the lens system further fulfills the following condition:

$$-0.7/f < 1/fa < 0.2/f$$

$$0.7f < f_{M2} < 5.3f$$

wherein:
   f represents the focal length of the whole lens system; and
   fa represents the focal length of a lens group defined between the front surface of the lens system and an object side surface forming an air space which is reduced by the movement of the object side one of the focusing lens units upon close focusing.

5. The invention of claim 1, wherein the lens system fulfills the following conditions:

$$-0.7/f < 1/fa < 0.2/f$$

$0.7f < f_{M2} < 5.3f$ $0.05 < |R| < 1.5$ wherein:
 f represents the focal length of the whole lens system;
 fa represents the focal length of a lens group defined between the front surface of the lens system and an object side surface forming an air space which is reduced by the movement of the object side one of the focusing lens units upon close focusing;
 $f_{M2}$ represents the focal length of the image side one of the focusing lens units; and
 R represents the ratio of the amount of movement of the object side of one of the focusing lens units to that of the image side one of the focusing lens units.

6. The invention of claim 1, wherein all of the focusing lens units are of a positive refractive power and are moved toward the object side upon close focusing.

7. The invention of claim 6, wherein a stationary lens group is located in between the focusing lens units, and the focusing lens units are moved in a body.

8. The invention of claim 1, wherein the object side one of the focusing lens units is of a negative refractive power and moved toward the image side upon close focusing, while the image side one of the focusing lens units is of a positive refractive power and moved toward the object side upon close focusing.

9. The invention of claim 1, wherein the lens system fulfills the following conditions:

$0.05 < |R| < 1.5$ $0.7f < f_{M2} < 5.3f$ wherein:
 R represents the ratio of the amount of movement of the object side one of the focusing lens units to that of the image side one of the focusing lens units;
 f represents the focal length of the whole lens system; and
 $f_{M2}$ represents the image side one of the focusing lens units.

10. An inverted telephoto type wide angle lens system according to the following table:

| | | Radius of Curvature | | Axial Distance | Refractive Index | | Abbe Number | |
|---|---|---|---|---|---|---|---|---|
| | | | | $f = 100$ $F_{NO} = 2.0$ $2\omega = 84°$ | | | | |
| L1 | $r_1$ | 217.54 | $d_1$ | 16.00 | $Nd_1$ | 1.5168 | $\nu d_1$ | 64.1 |
|    | $r_2$ | 871.54 | $d_2$ | 0.41 | | | | |
| L2 | $r_3$ | 122.00 | $d_3$ | 9.83 | $Nd_2$ | 1.6204 | $\nu d_2$ | 60.3 |
|    | $r_4$ | 54.40  | $d_4$ | 24.00 | | | | |
| L3 | $r_5$ | 125.98 | $d_5$ | 8.57 | $Nd_3$ | 1.6204 | $\nu d_3$ | 60.3 |
|    | $r_6$ | 55.51  | $d_6$ | 16.88 | | | | |
| L4 | $r_7$ | 327.89 | $d_7$ | 49.12 | $Nd_4$ | 1.7618 | $\nu d_4$ | 26.6 |
|    | $r_8$ | −355.46 | $d_8$ | 10.00 | (Aperture stop) | | | |
| L5 | $r_9$ | 597.62 | $d_9$ | 9.22 | $Nd_5$ | 1.8052 | $\nu d_5$ | 25.4 |
|    | $r_{10}$ | 1232.92 | $d_{10}*$ | 8.00–3.754 | | | | |
| L6 | $r_{11}$ | 274.02 | $d_{11}$ | 20.15 | $Nd_6$ | 1.8050 | $\nu d_6$ | 41.0 |
|    | $r_{12}$ | −113.99 | $d_{12}*$ | 1.02–5.266 | | | | |
| L7 | $r_{13}$ | −190.47 | $d_{13}$ | 7.72 | $Nd_7$ | 1.8052 | $\nu d_7$ | 25.4 |
|    | $r_{14}$ | 130.20 | $d_{14}$ | 12.00 | | | | |
| L8 | $r_{15}$ | −173.74 | $d_{15}$ | 8.60 | $Nd_8$ | 1.6968 | $\nu d_8$ | 55.5 |
|    | $r_{16}$ | −106.87 | $d_{16}$ | 0.41 | | | | |
| L9 | $r_{17}$ | −190.96 | $d_{17}$ | 5.00 | $Nd_9$ | 1.8052 | $\nu d_9$ | 25.4 |
|    | $r_{18}$ | −2780.97 | $d_{18}$ | 14.50 | $Nd_{10}$ | 1.7425 | $\nu d_{10}$ | 52.5 |
|    | $r_{19}$ | −126.31 | $d_{19}*$ | 12.00–4.279 | | | | |
| L10 | $r_{20}$ | 487.45 | $d_{20}$ | 17.50 | $Nd_{11}$ | 1.6968 | $\nu d_{11}$ | 55.5 |
|     | $r_{21}$ | −234.07 | | | | | | | wherein, * represents a variable air space.

11. An inverted telephoto type wide angle lens system comprising:
 an aperture stop;
 a first lens group located at the object side of the aperture stop, and
 a second lens group located at the image side of the aperture stop, the second lens group including at least two movable focusing lens components with at least one variable air space being located between the two movable focusing lens components, the focusing being practiced by only the movement of the focusing lens components to cause a change in the variable air space, said system including other lens components which remain stationary.

12. The invention of claim 11, wherein the lens system fulfills the following condition:

$$0.05 < |R| < 1.5$$

wherein R represents the ratio of the amount of movement of the object side one of the focusing lens components to that of the image side one of the focusing lens components.

13. The invention of claim 12, wherein the lens system further fulfills the following condition:

$$0.03 < (f_{M1}/f_{M2}) \cdot R < 1.5$$

wherein:
- $f_{M1}$ represents the focal length of the object side one of the focusing lens components; and
- $f_{M2}$ represents the focal length of the image side one of the focusing lens components.

14. The invention of claim 13, wherein the lens system further fulfills the following conditions:

$$-0.7/f < 1/fa < 0.2/f$$

$$0.7f/ < f_{M2} < 5.3f$$

wherein:
- f represents the focal length of the whole lens system; and
- fa represents the focal length of a lens group defined between the front surface of the lens system and an object side surface forming an air space which is reduced by the movement of the object side one of the focusing lens components upon close focusing.

15. The invention of claim 11, wherein the lens system fulfills the following conditions:

$$-0.7/f < 1/fa < 0.2/f$$

$$0.7f < f_{M2} < 5.3f$$

$$0.05 < |R| < 1.5$$

wherein:
- f represents the focal length of the whole lens system;
- fa represents the focal length of a lens group defined between the the front surface of the lens system and an object side surface forming an air space which is reduced by the movement of the object side one of the focusing lens components upon close focusing;
- $f_{M2}$ represents the focal length of the image side one of the focusing lens components, and
- R represents the ratio of the amount of movement of the object side one of the focusing lens components to that of the image side one of the focusing lens components.

16. The invention of claim 11, wherein all of the focusing lens components are of a positive refractive power and are moved toward the object side upon close focusing.

17. The invention of claim 16, wherein a stationary lens unit is located in between the focusing lens components, and the focusing lens components are moved in a body.

18. The invention of claim 11, wherein the object side one of the focusing lens component is of a negative refractive power and moved toward the image side upon close focusing, while the image side one of the focusing lens components is of a positive refractive power and moved toward the object side upon close focusing.

19. The invention of claim 11, wherein the lens system fulfills the following conditions:

$$0.05 < |R| < 1.5$$

$$0.5f < f_{M2} < 5.3f$$

wherein:
- R represents the ratio of the amount of movement of the object side one of the focusing lens components to that of the image side one of the focusing lens components;
- f represents the focal length of the whole lens system; and
- $f_{M2}$ represents the image side one of the focusing lens components.

* * * * *

UNITED STATES PATENT OFFICE
CERTIFICATE OF CORRECTION

Patent No. 4,449,793                    Dated May 22, 1984

Inventor(s) Akiyoshi Nakamura & Hisashi Tokumaru

It is certified that error appears in the above-identified patent and that said Letters Patent are hereby corrected as shown below:

Column 4, line 67, delete "the" and insert --any--;

Column 13, Table 7, line L7, delete "12.99" and insert --12.997--;

Column 16, line 17, after "claims" insert --in which we claim--;

Column 20, line 34, delete "0.5f" and insert --0.7--.

Signed and Sealed this

Twelfth Day of August 1986

[SEAL]

Attest:

DONALD J. QUIGG

Attesting Officer

Commissioner of Patents and Trademarks